(12) United States Patent
Lohmeier et al.

(10) Patent No.: US 6,978,678 B2
(45) Date of Patent: Dec. 27, 2005

(54) PRESSURE SENSOR

(75) Inventors: Franz-Josef Lohmeier, Miltenberg (DE); Joachim Ballmann, Amorbach (DE); Andreas Trützler, Grossheubach (DE); Peter Fürst, Burgstadt (DE); Uwe Vonau, Schwabach (DE); Jurgen Pleyer, Stockstadt (DE); Niki Speier, Frankisch-Grumbach (DE)

(73) Assignee: WIKA Alexander Wiegand GmbH & Co. KG, Klingenberg (DE)

( * ) Notice: Subject to any disclaimer, the term of this patent is extended or adjusted under 35 U.S.C. 154(b) by 30 days.

(21) Appl. No.: 10/874,414

(22) Filed: Jun. 23, 2004

(65) Prior Publication Data
US 2005/0000295 A1  Jan. 6, 2005

(30) Foreign Application Priority Data
Jun. 27, 2003 (EP) .................................. 03014729

(51) Int. Cl.[7] .............................................. G01L 9/06
(52) U.S. Cl. .......................................... 73/721; 73/727
(58) Field of Search ...................... 73/700, 727, 721, 73/720, 726

(56) References Cited

U.S. PATENT DOCUMENTS 4,412,203 A * 10/1983 Kurtz et al. .................... 338/4
6,508,130 B2 * 1/2003 Werner et al. ................. 73/756
6,715,356 B2 * 4/2004 Gerst et al. .................... 73/715
6,848,318 B2 * 2/2005 Gerst et al. .................... 73/715

FOREIGN PATENT DOCUMENTS

DE         4008156 A1    9/1991
EP         0372773       6/1990
GB         G8908951.0    7/1989

* cited by examiner

Primary Examiner—Edward Lefkowitz
Assistant Examiner—Andre Allen
(74) Attorney, Agent, or Firm—Roth & Goldman, P.A.

(57) ABSTRACT

The invention relates to a pressure sensor comprising a sensor element (2) having a flat membrane (4) which is transformed at its edge into a hollow-cylindrical ring (6) so that a central recess (20) is provided at the lower side (10) of the membrane (4). On the upper side (8) of the membrane (4) a resistance arrangement consisting of electric resistors is disposed. A sleeve (54) projects into the recess (20) and supports a first elastomeric sealing ring (66) which is tightly arranged at the circumferential area of the recess (20). Furthermore the sleeve (54) supports a second elastomeric sealing ring (68) which serves for sealing at a feeding tube for pressure fluid formed in a component part to which the pressure sensor is mountable. The sleeve (54) is rigidly connected to a disk (56) which is attached with its outer edge (58) to a casing (26) enclosing the sensor element (2). Mechanical forces occurring during and after assembly of the pressure sensor to the component part are introduced into the casing (26) via the sleeve (54) and the disk (56) so that the sensor element (2) is kept free from mechanical distortions which might entail an undesired deformation of the membrane (4) and consequently a falsification of the measuring signal.

27 Claims, 2 Drawing Sheets

PRESSURE SENSOR

DESCRIPTION

The invention relates to a pressure sensor comprising the features of the preamble of claim 1. A pressure sensor of this type is known (DE-A-40 08 156).

The known pressure sensor and the pressure sensor according to the invention are intended to be mounted on a component part having a feeding tube for the pressure fluid the pressure of which is to be measured using the pressure sensor. In order to enable the pressure fluid to flow from the feeding tube into the recess and thus to the lower side of the membrane, the known pressure sensor includes the sleeve which is directly fastened to the ring of the sensor element with the aid of the annular disk. A sleeve portion extending from the annular disk into the recess supports at its outside the first elastomeric sealing ring which ensures sealing between the sleeve and the circumferential surface of the recess. The sleeve has a second sleeve portion projecting from the disk in a direction opposed to the recess. This second sleeve portion supports on its outside the second elastomeric sealing ring and can be inserted into the feeding tube of the component part on which the pressure sensor is to be mounted. In this way, the two sealing rings guarantee that no pressure fluid can escape at the transition from the feeding tube into the sleeve and from the recess.

The measuring principle of the known pressure sensor and the pressure sensor according to the invention is based on the fact that the membrane is bent more or less in response to the intensity of pressure of the pressure fluid in the recess. This deformation of the membrane is transmitted to the resistors of the resistance arrangement connected to form a resistance bridge so that the conductivity and/or resistance value thereof varies. In this way, the electric cross voltage of the resistance bridge results as measuring signal which then can be intensified in a subsequent circuit and can be processed to form an output signal of the pressure sensor. This measuring principle requires keeping the membrane free from mechanical tensions, if possible, which are not caused by the pressure of the pressure fluid. Such mechanical tensions would result in a falsified measuring signal which, in turn, would require taking measures for failure compensation. Undesired mechanical loads and distortions of the sensor element and thus of the membrane may especially occur when mounting the pressure sensor on the component part which is provided with the feeding tube.

The object underlying the invention is to further develop the generic pressure sensor to the effect that faults of the measuring signal are prevented as far as possible. The pressure sensor is to be especially designed so that the sensor element and the membrane thereof are protected against mechanical distortions caused by the mounting operation on the component part including the feeding tube and against mechanical distortions after mounting has been completed.

This object is achieved according to the invention by the pressure sensor according to claim 1. It is provided in the pressure sensor according to the invention that the disk is attached to the casing with its outer edge and is fixedly connected to the sleeve. Thereby it is achieved that in the assembled state of the pressure sensor forces acting upon the sleeve are introduced to the casing through the disk instead of these forces being transmitted from the sleeve to the ring of the sensor element and thereby causing mechanical distortions of the membrane. The pressure sensor according to the invention thus can be assembled by the user in an uncomplicated manner without error compensation and/or adjustment being required for compensating an error of the measuring signal caused by distortions.

It may be provided in an advantageous embodiment of the invention that the casing has a cylindrical portion surrounding the outer surface area of the ring of the sensor element, that a first shoulder on which the disk rests with its outer edge is connected to the cylindrical portion of the casing in the area of the other basis of the ring, that a second shoulder on which the ring rests with its one basis is connected to the cylindrical portion of the casing in the area of the one basis of the ring, that between the other basis of the ring and the disk a clearance is provided and that between the outer surface area of the ring and the cylindrical portion of the casing a clearance is provided so that the sensor element is held in the casing only by means of the first sealing ring and the second shoulder. By virtue of this design the sensor element is supported at its one basis by means of the second shoulder contrary to the force caused by the pressure of the pressure fluid in the recess and is otherwise resiliently held merely by the first elastomeric sealing ring in radial direction (with respect to the axis of the ring). This type of support of the sensor element has the effect that the sensor element in no place has such contact with any one of the other elements of the pressure sensor that mechanical forces deforming the sensor element by this contact could be introduced into the sensor element.

Furthermore, it can be provided in an advantageous embodiment of the invention that the disk is connected to the sleeve such that from the one side of the disk a first sleeve portion projects into the recess and that from the other side of the disk a second sleeve portion projects, that the first sealing ring is fastened on the outside of the first sleeve portion, that the second sealing ring is fastened on the outside of the second sleeve portion, that a third elastomeric sealing ring is fastened on the inside of the sleeve and that the first sealing ring, the second sealing ring and the third sealing ring are integrally formed so that they jointly form a hose-like collar which surrounds the sleeve. This embodiment has the advantage that the pressure fluid only contacts the collar and the sensor element but not the sleeve. This enables the sleeve to be manufactured of a material, where appropriate, which is not resistant to the pressure fluid. Furthermore this embodiment has the advantage that the pressure sensor is optionally adapted to be mounted on a component part the feeding tube of which is formed by a connection piece inserted in the sleeve or on a component part the feeding tube of which is formed by a bore into which the second sleeve portion is inserted. In the latter case the second sealing ring ensures sealing between the sleeve and the feeding tube, and in the former case the third sealing ring ensures sealing between the sleeve and the feeding tube.

Further advantageous configurations of the invention are defined in the subclaims and moreover result from the description of the embodiments.

Embodiments of the invention are illustrated in the drawings and will be hereinafter explained in detail, in which.

In the following explanation of the FIGS. 1 to 4 the terms "top", "above" and similar terms refer to elements arranged at the top and/or above in the Figures and the terms "bottom", "below" and similar terms refer to elements arranged at the bottom and/or below in the Figures.

Figure 1:
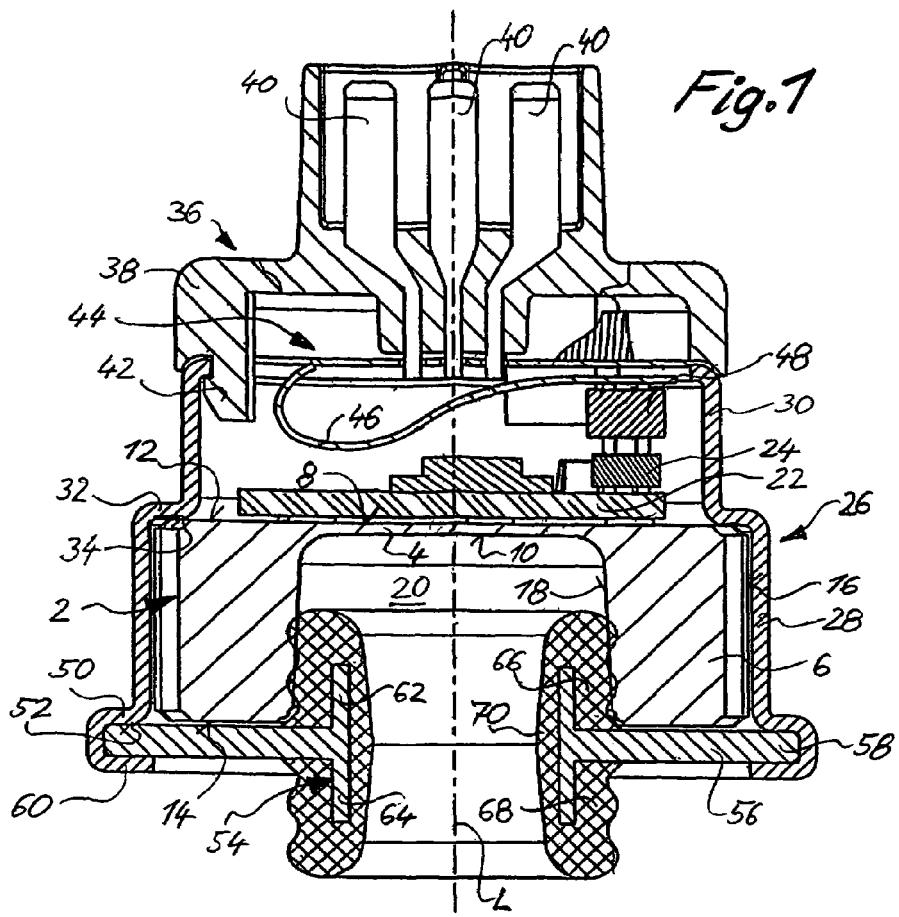
FIG. 1 shows a longitudinal section across an embodiment of the pressure sensor according to the invention.

The pressure sensor shown in FIG. 1 comprises a sensor element 2 formed by a flat membrane 4 and a hollow-cylindrical ring 6. The membrane 4 has a substantially planar upper side 8 and a lower side 10 parallel thereto and is transformed at its radially outer edge into the ring 6, wherein the upper side 8 of the membrane 4 is arranged coplanar with the one basis 12 of the circular cylindrical ring 6 which is formed at the top of the ring 6 in FIG. 1. The planar other basis 14 of the ring 6 is formed at the bottom of the same. The ring 6 has a radially outer surface area 16 which is a substantially circular cylindrical surface. Furthermore the ring 6 has a radially inner surface area 18 which has a circular cone shape in the shown embodiment, wherein its diameter is reduced in the direction to the top. The deviation of the circular conical inner surface area 18 from the circular cylindrical shape is small, however, and the inner surface area 18 may alternatively also be a circular cylindrical area.

Due to the above-described geometry of the sensor element 2, this sensor element has a central recess 20 whose ground area is formed by the lower side 10 of the membrane 4 and whose circumferential area is formed by the inner surface area 18 of the ring 6. During operation this recess is filled with a pressure fluid whose pressure is to be measured using the pressure sensor. If the pressure sensor is to be used, as in the shown case, for measuring excess pressure, the upper side 8 of the membrane is exposed to the atmospheric pressure. If the pressure sensor is to be used, deviating from the shown case, for measuring absolute pressure, it may be provided that the clearance between the hybrid circuit 22 and the membrane 6 is sealed and evacuated by means of an annular sealing which is not shown. Irrespective of whether an excess pressure or an absolute pressure is to be measured, depending on the intensity of pressure of the pressure fluid in the recess 20 a pressure difference between the upper side 8 and the lower side 10 of the membrane 4 is prevailing which results in the fact that the membrane is bent upwards (in the case of positive excess pressure or absolute pressure measurement) or downwards (in the case of negative excess pressure).

The sensor element 2 whose membrane 4 and ring 6 are integrally formed consists of a material adapted to the respective application, i.e. to the type of pressure fluid and the pressure measuring range. A ceramic material, for instance aluminum oxide ceramic ($Al_2O_3$) is especially suited. This material excels by a good spring-elastic property and is almost free from hysteresis. The sensor element 2 of the pressure sensor according to the invention therefore preferably is a ceramic sensor element.

A resistance arrangement of electric resistors which is not shown is attached to the upper side 8 of the membrane 4. These resistors may be formed by wire strain gauges or else by thick-film or thin-film resistors and are connected to form a resistance bridge. If the membrane 4 is deformed in response to the pressure acting in the recess 20, the electric resistors of the resistance arrangement are likewise deformed so that the conductivity thereof varies. The resistance arrangement is supplied with electric voltage, and in response to the deformation of the membrane 4 and the resistors the resistance arrangement provides an electric measuring signal in a way known per se which can be tapped off as electric cross voltage of the resistance bridge.

Above the sensor element 2 an electronic hybrid circuit 22 is arranged thereon which is electrically connected to the resistance arrangement and serves for supplying electric voltage to the resistance arrangement and for amplifying the measuring signal supplied by the resistance arrangement. The component parts of the hybrid circuit 22 include a pin strip 24 arranged on the upper side of the hybrid circuit 22.

The sensor element 2 and the hybrid circuit 22 are arranged inside a casing 26 which is open to the top and to the bottom. The casing 26 includes a circular cylindrical first portion 28 as well as a circular cylindrical second portion 30 having a smaller diameter than the first portion 28, wherein these two portions are connected to each other by a flat ring portion 32. The common central line L of the circular cylindrical portions 28 and 30 defines the axial direction of the casing 26 and of the entire pressure sensor, and the radii extending from the central line L define the radial direction of the casing and of the entire pressure sensor. At the inside of the casing 26 the flat ring portion 32 forms a shoulder 34 which is a circumferential toroidal shoulder in the represented embodiment. The sensor element 2 is located on this shoulder 34 with the outer edge of its upper basis 12. Between the cylindrical portion 28 of the casing 26 and the outer surface area 16 of the ring 6 there is provided a clearance which extends over the entire height and the entire circumference of the ring 6 so that the outer surface area 16 of the ring 6 does not contact the casing 26.

At the upper end of the casing 26 a connecting subassembly 36 is arranged. The connecting subassembly 36 substantially includes a cover 38 and electric connection elements formed by three connector pins 40 in the shown embodiment. The cover 38 is an injection-molded synthetic member and the connector pins 40 are cast into the cover. The cover 38 covers the open upper end of the casing 26, has an outer diameter which is approximately equal to the outer diameter of the second portion 30 of the casing 26 and rests on the upper edge of the casing 26, as it is illustrated in FIG. 1. The cover 38 of the connecting subassembly 36 is fastened to the casing 26 by means of a snap-in connection, wherein merely one of the snap-in hooks 42 is shown in FIG. 1. The snap-in hooks 42 engage behind the inwardly bent upper edge of the casing 26.

Between the edge of the cover 38 and the upper edge of the casing 26 a flexible printed board 44 is clamped which electrically contacts with the connector pins 40 and has a strip-like portion 46 to the free end of which a connector 48 slipped onto the pin strip 24 is attached. Via the strip conductors of the flexible printed board 44, the connector 48, the pin strip 24 and the hybrid circuit 22 the connector pins 40 of the connecting subassembly 36 are electrically connected to the resistance arrangement so that the output signal of the pressure sensor is provided at the connector pins 40 and can be supplied through the same to an evaluating circuit, which is not shown. The flexible printed board 44 may be equipped with electronic component parts, not shown, by which additional signal processing is effected and/or electromagnetic compatibility (EMC) is ensured.

At the lower end of the first portion 28 of the casing 26 a further flat ring portion 50 is integrally formed radially outside whose lower side forms a shoulder 52 which is a circumferential toroidal shoulder in the shown embodiment. In the area of the lower basis 14 of the ring 6 the shoulder 52 is arranged somewhat below the basis 14.

Furthermore the pressure sensor comprises a sleeve 54 projecting into the recess 20 and having a circular cylindrical shape in the shown embodiment. The sleeve 54 is fixedly and rigidly connected approximately in its axial center with a flat annular disk 56 which surrounds the sleeve 54 radially outside. The disk 56 extends radially outwardly so far that it protrudes to the shoulder 52 with its radially outer edge 58 and rests on the shoulder. To the shoulder 52 and/or the annular portion 50 a lower casing edge 60 of the casing 26 is connected which is beaded in the manner illustrated in FIG. 1 so that it encloses the outer edge 58 of the disk 56 and tensions it against the shoulder 52. In this way, the disk 56 is attached to the casing, namely in such manner that relative to the casing 26 it can move neither in axial direction nor in radial direction. Since the shoulder 52 is located somewhat further below than the lower basis 14 of the ring 6 of the sensor element 2, a clearance is provided between the lower basis 14 and the upper side of the disk 56 so that the ring 6 and the disk 56 do not contact each other on the entire basis 14.

As the sleeve 54 is connected to the disk 56 approximately in its axial center, it has a first sleeve portion 62 projecting from the one side of the disk 56 into the recess 20 as well as a second sleeve portion 64 projecting downwards from the other side of the disk 56. Between the outside of the first sleeve portion 62 and the circumferential area of the recess 20 formed by the inner surface area 18 an annular clearance is provided so that the first sleeve portion 62 and the circumferential area of the recess 20 do not contact each other. A first elastomeric sealing ring 66 for instance made of a polymeric synthetic material is arranged in this clearance. The sealing ring 66 is supported radially inside at the outside of the first sleeve portion 62 and is tightly adjacent to the inner surface area 18 with its radially outer surface so that pressure fluid cannot escape from the recess 20 between the sleeve 54 and the ring 56.

On the outside of the second sleeve portion 64 a second elastomeric sealing ring 68 is arranged which is likewise preferably made of polymeric synthetic material. The second sealing ring 68 serves for sealing at a feeding tube from which the pressure fluid is supplied into the recess 20, when the pressure sensor is mounted on a component part as will be illustrated hereinafter with reference to FIG. 2.

Furthermore the sleeve 54 supports a third elastomeric sealing ring 70 which likewise preferably consists of polymeric synthetic material. The third sealing ring 70 is arranged at the inside of the sleeve 54 and, in case of need, serves just as the second sealing ring 68 for sealing at a feeding tube for the pressure fluid.

It is a peculiarity of the embodiment shown in FIG. 1 that the first sealing ring 66, the second sealing ring 68 and the third sealing ring 70 are formed integrally and are transformed one into the other so that they jointly form a hose-like collar which encloses the entire sleeve 54 as is shown in FIG. 1. This entails the fact that the pressure fluid cannot contact the sleeve 54 so that the sleeve 54 can be fabricated of a material, where appropriate, which is not resistant to the pressure fluid.

In the represented embodiment the sleeve 54 and the disk 56 are formed integrally as an injection-molded plastic part so that the sleeve 54 and the disk 56 are rigidly connected to each other. As an alternative, the sleeve 54 and the disk 56 may be integrally formed as a die-cast metal part. The entire collar consisting of the three sealing rings 66, 68 and 70 is molded to the sleeve 54 and the disk 56 so that the collar, the sleeve 54 and the disk 56 form a coherent sealing member which is reinforced by the sleeve 54 and the disk 56. Where appropriate, this sealing member may be manufactured in an injection process as a fully plastic part according to the two-component part injection molding process.

Figure 2:
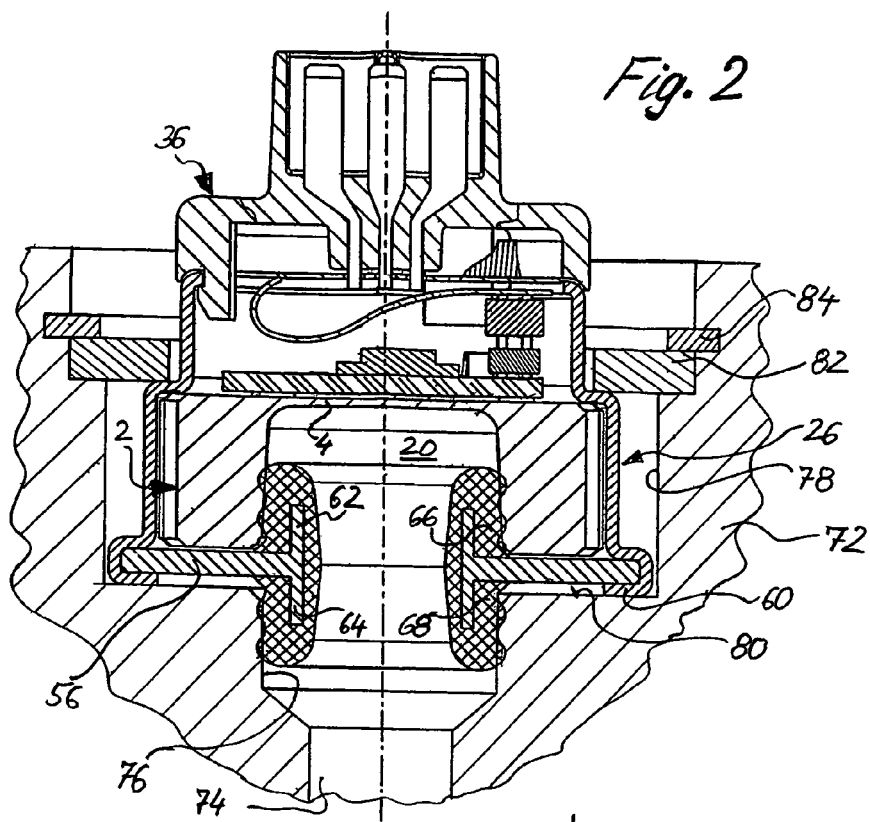
FIG. 2 shows the pressure sensor according to FIG. 1 in the assembled state according to a first variant.
Figure 3:
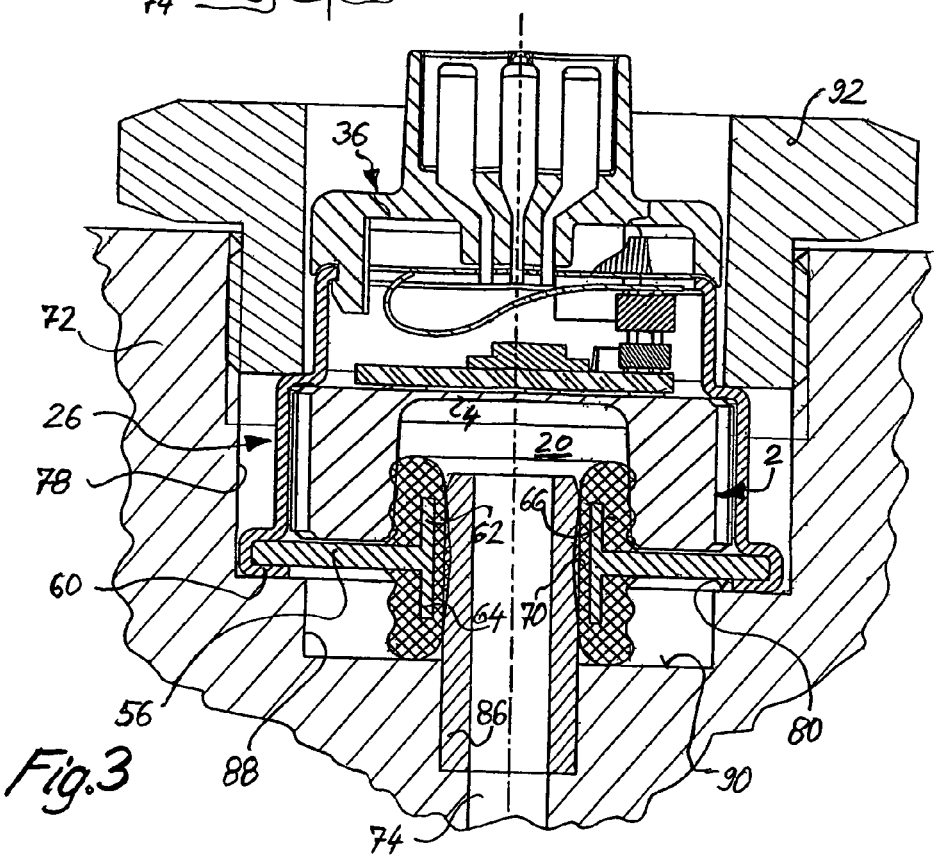
FIG. 3 shows the pressure sensor according to FIG. 1 in the assembled state according to a second variant.

In FIG. 1—as well as in the FIGS. 2 and 3—the three sealing rings 66, 68 and 70 which form the collar are shown in the released state in order to show the surface configuration of the three sealing rings. The radially outer surfaces of the first sealing ring 66 and of the second sealing ring 68 have a wave-like profile in the longitudinal section shown in FIG. 1 in the sectional plane of which the central line L and the longitudinal axis of the sleeve 54 are located so that each of these surfaces is formed by alternately successive circumferential beads and circumferential recesses and/or indentations. This configuration entails an especially efficient sealing effect. Deviating from the representation in FIG. 1, the beads provided at the first sealing ring are flat in practice and do not penetrate the inner surface area 18 of the ring 6, when the first sealing ring 66 takes its position between the first sleeve portion 62 and the circumferential area of the recess 20 formed by the inner surface area 18.

It is resulting from the foregoing description that the sensor element 2 is carried and supported exclusively by the shoulder 34 provided at the ring portion 32 and the first sealing ring 66. By virtue of the clearance between the lower basis 14 and the disk 56 no forces can be introduced into the sensor element via the lower basis 14. By virtue of the clearance between the outer surface area 14 of the ring 6 and the first portion 28 of the casing 26 no forces can be introduced into the sensor element via the outer surface area 16, either. In the radial direction the sensor element 2 even has certain mobility, because radially it is only supported by the first sealing ring 66. This type of support or mounting of the sensor element 2 can be referred to as "floating support" and ensures that forces which might result in mechanical distortions of the sensor element 2 cannot reach the sensor element 2 and/or are withheld from the same.

FIG. 2 shows one of plural possibilities of how the pressure sensor according to FIG. 1 can be mounted on a component part 72 and/or installed in the same. The component part 72 includes a feeding tube 74 guiding the pressure fluid the pressure of which is to be measured by the pressure sensor. The feeding tube 74 is a bore in the component part 72 and has an extended end portion 76. The end portion 76 opens into a coaxial bore 78 serving as location hole for the pressure sensor. An annular supporting area 80 is provided at the transition between the extended end portion 76 and the bore 78.

The pressure sensor is inserted in the bore 78 such that the second sleeve portion 64 and the second sealing ring 68 supported by the latter project downwards into the extended end portion 76 in such manner that the radially outer surface of the second sealing ring 68 is tightly adjacent to the radially inner surface of the extended end portion 76. At the same time, the lower side of the beaded casing edge 60 rests on the supporting area 80. In this mounting position the pressure sensor is held with the aid of an annular supporting disk 82 which is attached to the component part 72 by means of a retaining ring 84. The supporting disk 82 rests with its radially inner edge on the upper side of the flat ring portion 32 such that the lower side of the beaded casing edge 60 is forced against the supporting area 80 at the component part 72. In other words, this means that the casing 26 of the pressure sensor is clamped between the supporting area 80 and the lower edge of the supporting disk 82 and thus is fastened to the component part 72. The tension forces occurring and acting in axial direction of the pressure sensor are absorbed by the casing 26 and do not arrive at the sensor element 2 so that the latter is protected against deformations caused by axial distortions.

Radial and possibly axial forces transmitted via the second sealing ring 68 to the sleeve portion 64 are absorbed by the disk 56 and introduced into the casing 26. In so doing, these forces are largely kept away from the first sealing ring 66 so that by the installation and/or assembly operation in the area of the first sealing ring 66 no radial forces are caused which might deform the ring 6 of the sensor element 2 in an undesired manner. In other words, this means that the two sealing portions, i.e. the sealing portion between the first sealing ring 66 and the inner surface area 18, on the one hand, and the sealing portion between the second sealing ring 68 and the surface of the extended end portion 76 at the component part 72, on the other hand, are mechanically decoupled from each other. The sensor element 2 and the membrane 4 thereof are thus largely protected against mechanical distortions caused by the mounting operation on the component part 72.

FIG. 3 shows another possibility of mounting the pressure sensor according to FIG. 1 on the component part 72. The component part 72 includes the bore 78 serving as location hole for the pressure sensor which at its lower end is transformed via the supporting area 80 into a bore section 88 having a smaller diameter which is confined by a bottom area 90 at its lower end. As in the variant according to FIG. 2, the pressure sensor rests with the lower side of the beaded casing edge 60 on the supporting area 80. Instead of the supporting disk 82 and the retaining ring 84 of the first variant according to FIG. 2, in the second variant according to FIG. 3 a union nut 92 having a male thread is provided which is screwed into the bore 78 and with its lower side acts upon the upper side of the ring portion 32 of the casing 26 so that the pressure sensor is tightened to the component part 72 in this way. The axial forces occurring are withheld from the sensor element 2 as in the first variant according to FIG. 2.

In the variant according to FIG. 3 the end of the feeding tube 74 is formed by a connection piece 86 projecting centrally upwards from the bottom area 90. While the pressure sensor is inserted into the bore 78 in the course of the assembly to the component part 72, the sleeve 54 and the third sealing ring 70 supported by the latter are pushed onto the connection piece 86 so that the third sealing ring 70 is tightly adjacent to the outside of the connection piece 86. The radial forces occurring which are exerted by the connection piece 86 on the third sealing ring 70 are absorbed by the sleeve 54 and transmitted to the casing 26 via the disk 56. The sleeve 54 ensures that these radial forces cannot act upon the first sealing ring 66 to a significant extent so that, in turn, the ring 6 of the sensor element 2 is kept free from mechanical distortions and/or loads by the assembly operation and after assembly. Even if, as in the variant according to FIG. 3, sealing at the component part 72 is effected by the third sealing ring 70, the two sealing portions in turn are mechanically decoupled from each other, i.e. the sealing portion between the first sealing ring 66 and the inner surface area 18, on the one hand, and the sealing portion between the third sealing ring 70 and the outer surface of the connection piece 86, on the other hand.

The invention is not restricted to the afore-described details of the pressure sensor and the two assembly variants according to the FIGS. 2 and 3. What is essential to the invention is the fact that by the configuration of the pressure sensor the sensor element 2 and the membrane 4 thereof are kept free from mechanical loads occurring during assembly of the pressure sensor to the component part 72.

In the above-described embodiment of the pressure sensor the casing thereof is a deep-drawn metal part. The casing 26 can also be manufactured by a manufacturing method other than deep-drawing of metal, it can also be a multi-part casing and, as an alternative, can be an injection-molded plastic part. Furthermore the configuration of the connecting subassembly 36 may deviate from the one shown in the drawings. The configuration and the design of the hybrid circuit 22 depend on the respective application of the pressure sensor. The flexible printed board 44 is preferably used, but it is an optional element.

In the afore-described preferred embodiment according to FIG. 1 a clearance is provided between the outer surface area 16 and the portion 28 of the casing and another clearance is provided between the lower basis 14 and the upper side of the disk 56 so that neither in the region of its outer surface area 16 nor in the region of its lower basis 14 does the ring 6 contact other elements of the sensor element. Deviating herefrom, however, in these regions a contact with other elements of the pressure sensor can be admitted, if despite this contact during assembly of the pressure sensor and after assembly thereof to the component part only such mechanical forces are transmitted to the sensor element 2 via the possibly present contact points that these forces do not entail a significant distortion of the sensor element 2.

FIG. 1 shows the presently preferred embodiment of the sealing member consisting of the three sealing rings 66, 68 and 70, the sleeve 54 and the disk 56. The sealing member may also have a design different from that illustrated in the FIGS. 1 to 3, however.

Figure 4:
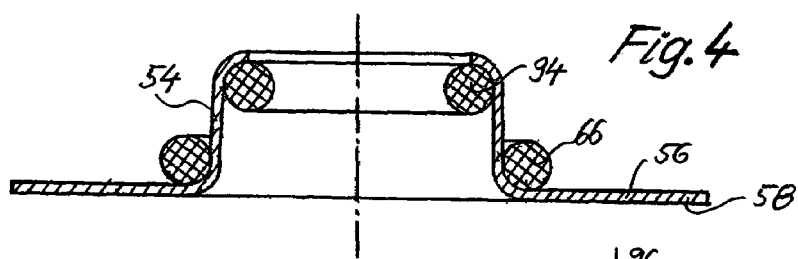
FIG. 4 shows a longitudinal section across a second embodiment of a sealing member.

Another embodiment of the sealing member is shown in longitudinal section in FIG. 4. This embodiment of the sealing member is suited for the assembly variant according to FIG. 3. In the sealing member according to FIG. 4 the sleeve 54 and the disk 56 are formed integrally as deep-drawn metal part. On the outside the sleeve 54 supports the first sealing ring 66 in the form of an O-ring seal which serves for sealing at the radially inner lower edge of the ring 6 of the sensor element 2. On the inside the sleeve 54 supports as second sealing ring 94 an O-ring seal intended for sealing at the feeding tube of the component part, for instance the connection piece 86 according to FIG. 3. As regards the mechanical decoupling of the two sealing portions, the sealing member according to FIG. 4 has the same function as the sealing member according to FIG. 1 in the second assembly variant according to FIG. 3.

Figure 5:
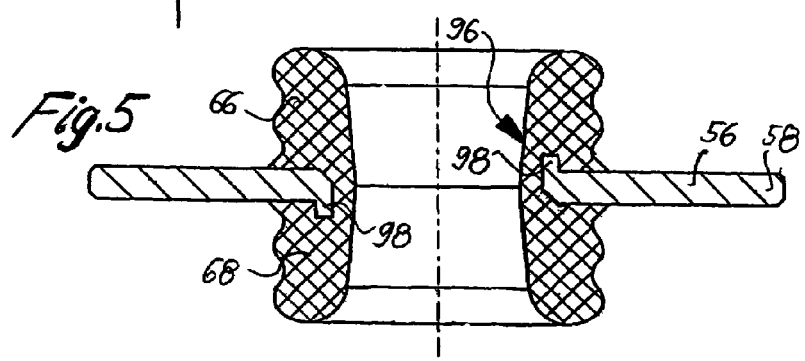
FIG. 5 shows a longitudinal section across a third embodiment of a sealing member.

FIG. 5 shows a longitudinal section of another embodiment of the sealing member. This embodiment may be provided if, as in the case of the assembly variant according to FIG. 2, the radially outer surface of the second sealing ring 68 is to be tightly adjacent to the radially inner surface of the feeding tube 74 and/or to the radially inner surface of the extended end portion 76. In the embodiment according to FIG. 5 the first elastomeric sealing ring 66 and the second elastomeric sealing ring 68 are formed integrally as in the sealing member of the pressure sensor according to FIG. 1 so that they are transformed from one into the other and jointly form a hose-like collar. Also the sleeve is formed integrally with the two sealing rings 66 and 68 so that a sealing unit 96 is resulting in which the two sealing rings 66 and 68, on the one hand, and the sleeve, on the other hand, are directly transformed from one into the other and do not form separate elements attached to each other. Therefore this sealing unit 96 can be considered to be a sleeve having a double sealing function, namely a sealing function in the area of the portion of the sleeve formed by the first sealing ring 66 and a sealing function in the area of the portion of the sleeve formed by the second sealing ring 68.

As an alternative, the sealing unit 96 can also be considered to be a double sealing ring having a first portion formed by the first sealing ring 66 and a second portion formed by the second sealing ring 68.

The sealing unit 96 has approximately in its axial center a circumferential groove in which the disk 56 engages with its inner edge. Teeth 98 projecting in axial direction which serve for improving the anchoring of the sealing unit 96 at the disk 56 and in the shown embodiment alternately project from the one and the other side of the disk 56 can be formed integrally with the inner edge of the disk 56.

In the embodiment of the sealing member according to FIG. 5 the material of the sealing unit 96 and the dimensions thereof are selected such that the radially outer surfaces of the two sealing rings 66 and 68 are sufficiently resilient to be adapted to conform to the respective associated sealing surface and that, on the other hand, the sealing unit 96 is sufficiently stiff to be adapted to press the radially outer surfaces of the sealing rings 66 and 68 with sufficient force against the associated sealing surface. It has turned out that even in the case of the sealing member according to FIG. 5 the two sealing portions illustrated in connection with FIG. 2 are decoupled from each other in a sufficiently mechanical manner to prevent undesired deformations of the ring 6 of the sensor element 2, when the pressure sensor is installed as in FIG. 2.

The invention is about a pressure sensor comprising a sensor element 2 which has a flat membrane 4 which is transformed at its edge into a hollow-cylindrical ring 6 so that a central recess 20 is provided on the lower side 10 of the membrane 4. On the upper side 8 of the membrane 4 a resistance arrangement of electric resistors is arranged. A sleeve 54 protrudes into the recess 20 and supports a first elastomeric sealing ring 66 which is tightly arranged at the circumferential surface of the recess 20. Furthermore the sleeve 54 supports a second elastomeric sealing ring 68 which serves for sealing at a feeding tube for pressure fluid formed in a component part on which the pressure sensor is mountable. The sleeve 54 is rigidly connected to a disk 56 the outer edge 58 of which is attached to a casing 26 surrounding the sensor element 2. Mechanical forces occurring during and after assembly of the pressure sensor to the component part are introduced into the casing 26 via the sleeve 54 and the disk 56 so that the sensor element 2 is kept free from mechanical distortions which might entail an undesired deformation of the membrane 4 and thus a falsification of the measuring signal.

What is claimed is:

1. A pressure sensor comprising
   a sensor element (2) including a substantially hollow-cylindrical ring (6) and a flat membrane (4) having an upper side (8) and a lower side (10), wherein the membrane (4) is fixedly connected to the ring (6) at its edge and is arranged in the area of the one basis (12) of the ring (6) so that the sensor element (2) has a central recess (20) starting out from the other basis (14) of the ring (6), the ground area of which recess is formed by the lower side (10) of the membrane (4) and the circumferential area of which is formed by the inner surface area (18) of the ring (6),
   a resistance arrangement consisting of electric resistors which are arranged on the upper side (8) of the membrane (4) such that the electric conductivity thereof varies when the membrane (4) is deformed,
   a casing (26) into which the sensor element (2) is inserted,
   a sleeve (54) which projects into the recess (20) and through which a pressure fluid can be guided into the recess (20) and to the lower side (10) of the membrane (4),
   an annular disk (56) which is arranged adjacent to the other basis (14) of the ring (6) of the sensor element (2) and is connected at its inner edge to the sleeve (54) and supports the same,
   a first elastomeric sealing ring (66) supported by the sleeve (54) and being tightly adjacent to the circumferential area of the recess (20), and
   a second elastomeric sealing ring (68, 94) supported by the sleeve (54),
   wherein the pressure sensor is adapted to be mounted on a component part (72) having a feeding tube (74) for the pressure fluid and wherein the second sealing ring (68, 94) serves for sealing at the feeding tube (74),
   characterized in that the disk (56) is attached to the casing (26) with its outer edge (58) and is fixedly connected to the sleeve (54).

2. A pressure sensor according to claim 1, characterized in that the casing (26) has a cylindrical portion (28) surrounding the outer surface area (16) of the ring (6) of the sensor element (2), and that in the area of the other basis (14) of the ring (6) a first shoulder (52) on which the disk (56) rests with its outer edge (58) is connected to the cylindrical portion (28) of the casing (26).

3. A pressure sensor according to claim 2, characterized in that a beaded casing edge (60) which encompasses and thereby holds the outer edge (58) of the disk (56) is connected to the first shoulder (52).

4. A pressure sensor according to claim 2, characterized in that a second shoulder (34) on which the ring (6) rests with its one basis (12) is connected to the cylindrical portion (28) of the casing (26) in the area of the one basis (12) of the ring (6), that a clearance is provided between the other basis (14) of the ring (6) and the disk (56) and that a clearance is provided between the outer surface area (16) of the ring (6) and the cylindrical portion (28) of the casing (26) so that the sensor element (2) is held in the casing (26) only by means of the first sealing ring (66) and the second shoulder (34).

5. A pressure sensor according to claim 4, characterized in that the circumferential area of the recess (20) is a circular cylindrical area.

6. A pressure sensor according to claim 4, characterized in that the circumferential area of the recess (20) is a circular conical surface, wherein the recess (20) is tapered in the direction of its ground area.

7. A pressure sensor according to claim 4, characterized in that the ring (6) and the membrane (4) are integrally formed.

8. A pressure sensor according to claim 7, characterized in that the sensor element (2) consists of a ceramic material.

9. A pressure sensor according to claim 8, characterized in that the ceramic material is $Al_2O_3$.

10. A pressure sensor according to claim 4, characterized in that the sleeve (54) and the disk (56) are integrally formed.

11. A pressure sensor according to claim 10, characterized in that the sleeve (54) and the disk (56) consist of synthetic material adapted to be injection-molded or metal adapted to be die-cast.

12. A pressure sensor according to claim 10, characterized in that the sleeve (54) and the disk (56) are manufactured of sheet metal as deep-drawn part or parts, respectively.

13. A pressure sensor according to claim 4, characterized in that the disk (56) is connected to the sleeve (54) such that from the one side of the disk (56) a first sleeve portion (62)

projects into the recess (20) and that a second sleeve portion (64) projects from the other side of the disk (56).

14. A pressure sensor according to claim 13, characterized in that the first sealing ring (66) is fastened to the outside of the first sleeve portion (62) and that the second sealing ring (68) is fastened to the outside of the second sleeve portion (64).

15. A pressure sensor according to claim 14, characterized in that a third elastomeric sealing ring (70) is fastened to the inside of the sleeve (54).

16. A pressure sensor according to claim 15, characterized in that the first sealing ring (66), the second sealing ring (68) and the third sealing ring (70) are integrally formed so that they jointly form a hose-like collar which encloses the sleeve (54).

17. A pressure sensor according to claim 16, characterized in that the first sealing ring (66), the second sealing ring (68) and the third sealing ring (70) are manufactured in that the sleeve (54) is extrusion-coated with an elastic material adapted to be injection-molded.

18. A pressure sensor according to claim 17, characterized in that in the two-component injection-molding process first the sleeve (54) and the disk (56) are injection-molded in one piece of synthetic material adapted to be injection-molded and subsequently the three sealing rings (66, 68, 70) are injection-molded in one piece of polymeric synthetic material.

19. A pressure sensor according to claim 4, characterized in that the first sealing ring (66), the second sealing ring (68) and the sleeve are integrally formed.

20. A pressure sensor according to claim 14, characterized in that the radially outer surface of the first sealing ring (66) and/or of the second sealing ring (68) is designed such that it has a wave-shaped profile in a longitudinal section including the longitudinal axis of the sleeve (54).

21. A pressure sensor according to claim 1, characterized in that the second sealing ring (94) is fastened to the inside of the sleeve (54).

22. A pressure sensor according to claim 1, characterized by an electronic hybrid circuit (22) which is arranged inside the casing (26) adjacent to the upper side (8) of the membrane (4) and serves for supplying electric voltage to the resistance arrangement and for amplifying the measuring signal supplied by the resistance arrangement.

23. A pressure sensor according to claim 22, characterized by an annular sealing compound provided between the radially outer edge of the hybrid circuit (22) and the upper side (8) of the membrane (4), wherein the annular sealing compound seals the clearance between the tipper side (8) of the membrane (4) and the hybrid circuit (22) and said clearance is evacuated.

24. A pressure sensor according to claim 23, characterized by a connecting subassembly (36) which is fastened to the casing (26) and includes electric connecting elements (40).

25. A pressure sensor according to claim 24, characterized in that the connecting subassembly (36) comprises a cover (38) which locks the casing (26) at the end thereof opposed to the disk (56) and supports connector pins (40) as connecting elements.

26. A pressure sensor according to claim 25, characterized in that the cover (38) is fastened to the casing (26) by means of a snap-on connection (42).

27. A pressure sensor according to claim 24, characterized by a flexible printed board (44) inserted between the connecting subassembly (36) and the casing (26) via the strip conductors of which the connecting subassembly (36) and the resistance arrangement are electrically connected to each other.

* * * * *